United States Patent
Zhang et al.

(10) Patent No.: US 6,693,252 B2
(45) Date of Patent: Feb. 17, 2004

(54) PLASMA MIG WELDING WITH PLASMA TORCH AND MIG TORCH

(75) Inventors: Lin Zhang, Appleton, WI (US); Timm Matus, Appleton, WI (US)

(73) Assignee: Illinois Tool Works Inc., Glenview, IL (US)

(*) Notice: Subject to any disclaimer, the term of this patent is extended or adjusted under 35 U.S.C. 154(b) by 59 days.

(21) Appl. No.: 10/114,141

(22) Filed: Apr. 1, 2002

(65) Prior Publication Data

US 2003/0183604 A1 Oct. 2, 2003

(51) Int. Cl.[7] .............................................. B23K 10/00
(52) U.S. Cl. ......................... 219/121.45; 219/121.46; 219/121.48; 219/137 R; 219/75
(58) Field of Search ................. 219/121.45, 121.46, 219/121.59, 121.48, 121.39, 74 TS, 137 R, 137 WM

(56) References Cited

U.S. PATENT DOCUMENTS

| | | | |
|---|---|---|---|
| 4,048,465 A | * | 9/1977 | Manz ..................... 219/121.52 |
| 4,321,454 A | * | 3/1982 | Willems et al. ............... 219/75 |
| 4,336,441 A | * | 6/1982 | Godai et al. ......... 219/137 WM |
| 4,370,538 A | * | 1/1983 | Browning .............. 219/121.59 |
| 5,994,659 A | * | 11/1999 | Offer ........................... 219/75 |

OTHER PUBLICATIONS

Miller® The Power of Blue Invision® 456P And Phoenix® 456 CC/CV (230/460 And 575 Volt Models) Owner's Manual Feb. 2001.
Miller® The Power of Blue Dynasty 300 DX, Owner's Manual, Jun. 2000.
Streaking ahead at the speed of light, Invitation To The World Premiere Of Laserhybrid Welding Fronius 2001.
Application report, Hybrid laser welding, Industrial Laser Solutions, Dec. 2001.
Advantage of Plasma Welding, Practical Welding Today, Jul./Aug. 1999.

* cited by examiner

Primary Examiner—Mark Paschall
(74) Attorney, Agent, or Firm—George R. Corrigan

(57) ABSTRACT

Methods and apparatuses for plasma MIG welding or TIG MIG welding are disclosed. They include a plasma or TIG torch for following along a weld path by a MIG torch (or the order may be reversed). A constant distance may be maintained between the torches, and the angle of the torches, relative to the workpiece, may vary. The MIG process is performed EP or EN in various embodiments.

25 Claims, 1 Drawing Sheet

PLASMA MIG WELDING WITH PLASMA TORCH AND MIG TORCH

FIELD OF THE INVENTION

The present invention relates generally to the art of welding and welding power supplies. More specifically, it relates to welding with a plasma process or a TIG process and a MIG process.

BACKGROUND OF THE INVENTION

There are a wide number of known welding processes used for a variety of welding applications. Various processes have strengths and weaknesses with respect to characteristics such as speed, precision, workpiece composition, cost, flexibility, etc.

For example, MIG welding (metal inert gas welding) is relatively fast, but somewhat imprecise. The process is fast because, in part, a consumable wire electrode is used as a filler metal. However, for some applications, such as welding galvanized steel, MIG does not perform well, at least in part because the MIG process, which is typically DC, does not, effectively prepare for welding (or remove) the zinc on the steel. If not properly prepared the zinc can vaporize during the welding process and cause bubbles in the weld. Also, for some applications an even faster MIG process is desired.

Another process, TIG welding, is precise and can work with galvanized steel, but TIG is a relatively slow process. Thus, it is often used for high-quality, low speed applications.

Plasma arc welding (PAW) is a welding process that also does not lend itself readily to high speed welding. For example, PAW is best performed at under 100 amps, and it is particularly useful for welding under 20 amps and as low as 0.1 amp. If higher current is needed, PAW is performed in a keyhole process, where the plasma gas creates a hole in the workpiece, and molten metal flowing behind the moving hole creates the weld bead.

TIG welding has been combined with plasma welding in plasma TIG welding. Plasma TIG welding has been performed using a TIG torch, followed by a plasma torch, followed by a TIG torch. Plasma TIG welding is not well suited for galvanized steel, and TIG can be slow.

A weld process that can be fast and precise is laser MIG welding. This entails the simultaneous application of a laser beam and a MIG arc on the weld. While the process may be fast, precise, and useful on galvanized steel, it is expensive and may be difficult to use.

Accordingly, a welding process that provides for relative high speed, acceptable precision, without excess cost is desirable. Preferably the process will weld galvanized steel.

SUMMARY OF THE PRESENT INVENTION

According to a first aspect of the invention a method of plasma MIG welding includes creating a plasma arc and a MIG arc between torches and a workpiece. There is relative movement between the torches and a weld path.

A constant distance is maintained between the plasma torch and the MIG torch in one embodiment.

According to a second aspect of the invention a system of plasma MIG welding includes a plasma torch and a MIG torch. The MIG torch and the plasma torch are mounted such that they are a fixed distance from one another.

The angle of the plasma arc is between +10 degrees and −10° degrees, or between +5 degrees and perpendicular, and the angle of the MIG torch is preferably between +10 degrees and −45°, or between 0 degrees and −30 degrees, in various embodiments.

The distance between the plasma torch and the MIG torch is greater for faster movement along weld path in another embodiment.

According to a third aspect of the invention a system for plasma MIG welding includes at least one power source having a plasma power output and a MIG power output. The power source also has a control input and a controller is operatively connected to the control input.

The power source includes a plasma power source and a MIG power source, and the controller includes a plasma controller and a MIG controller in various embodiments.

According to a fourth aspect of the invention a product is formed by the process of plasma MIG welding a plurality of workpieces. At least one of the workpieces is comprised of galvanized steel, such as G-60 or G-90.

According to a fifth aspect of the invention a method of TIG MIG welding includes creating a TIG arc and a MIG arc between torches and a workpiece. There is relevant movement between the torches and a weld path.

A constant distance is maintained between the TIG torch and the MIG torch in one embodiment.

According to another aspect of the invention a system of TIG MIG welding includes a TIG torch and a MIG torch. The MIG torch and the TIG torch are mounted such that they are a fixed distance from one another.

The angle of the TIG arc is between +10 degrees and −10° degrees, or between +5 degrees and perpendicular, and the angle of the MIG torch is between +10 degrees and 45°, or between 0 degrees and −30 degrees, in various embodiments.

The distance between the TIG torch and the MIG torch is greater for faster movement along weld path in another embodiment.

According to yet another aspect of the invention a system for TIG MIG welding includes at least one power source having a TIG power output and a MIG power output. The power source also has a control input and a controller is operatively connected to the control input.

The power source includes a TIG power source and a MIG power source, and the controller includes a TIG controller and a MIG controller in other embodiments.

According to an eighth aspect of the invention a product is formed by the process of TIG MIG welding a plurality of work pieces. At least one of the workpieces is comprised of galvanized steel, such as G-60 or G-90.

The MIG and/or TIG process is performed EP or EN in various embodiments.

Other principal features and advantages of the invention will become apparent to those skilled in the art upon review of the following drawings, the detailed description and the appended claims.

Figure 1:
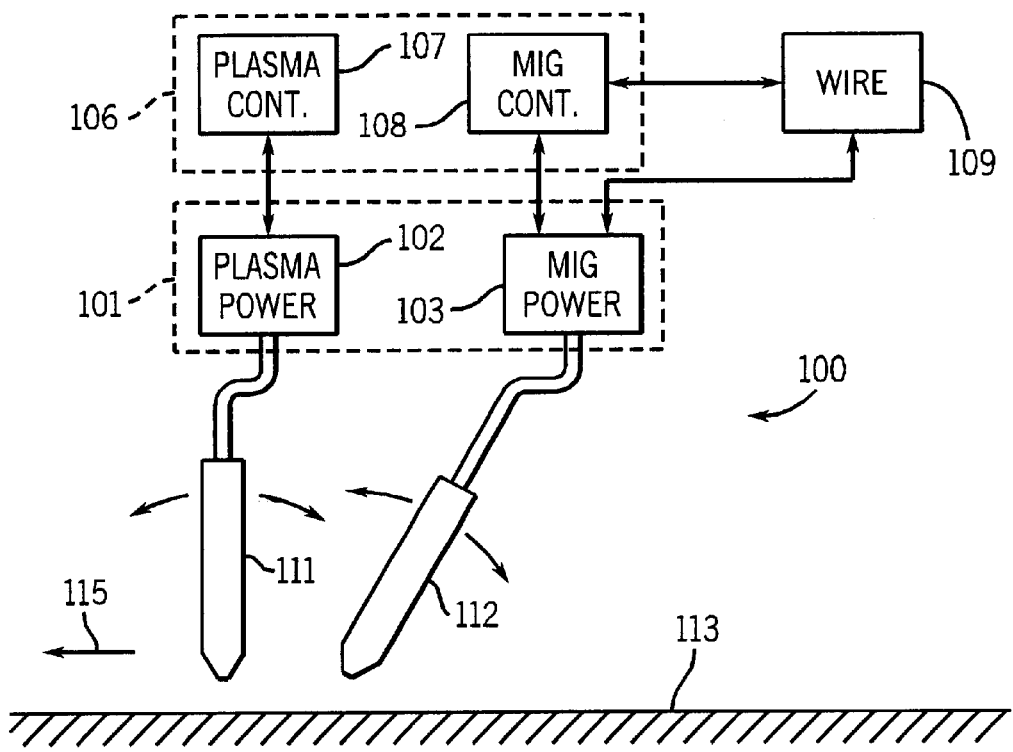
FIG. 1 is a diagram of a plasma MIG system in accordance with the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular system and method using particular power supplies, it should be understood at the outset that the invention may be implemented using other embodiments, including other components and other methods.

Generally, the invention is a method and apparatus for plasma MIG welding. Plasma MIG welding, as used herein, includes a welding process performed with a plasma arc and a MIG arc acting on a common weld path, either sequentially in any order, or simultaneously.

The preferred embodiment provides that a plasma torch is mounted with a MIG torch, such that as the plasma torch is moved along the weld path, the MIG torch trails by a small distance (½ inch, e.g.). Two power supplies are provided, one for the plasma torch, and one for the MIG torch. The torches move relative to the weld path on the workpiece, by moving the torches, or moving the workpiece, or moving both torches and the workpiece. Relative movement of a torch along a weld path, as used herein, includes movement of the torch relative to the workpiece, and either the workpiece can be moved, or the torch can be moved.

The present invention performs particularly well with galvanized steel because the plasma arc prepares the zinc in the steel for welding in advance of the MIG arc, and the MIG arc provides the welding energy and filler metal. The speed of plasma MIG can be 3–4 times the speed of MIG alone. Also the disadvantage of MIG welding—difficulty in welding a workpiece that needs cleaning or preparing, such as galvanized steel, is overcome.

A plasma MIG system 100 in accordance with the present invention is shown in FIG. 1 and includes a power source 101, a controller 106, a wire feeder 109, a plasma torch 111, and a MIG torch 112. Power source 101 provides power to the torches, and wire feeder 109 provides wire to MIG torch 112 (through the power source). Controller 106 controls the process. The torches are moved along a weld path on a workpiece 113 (in the direction of arrow 115) in the plasma MIG process.

The preferred embodiment provides that power source 101 includes a plasma power source 102, having a plasma power output, and a MIG power source 101, having a MIG power output. Plasma power source 102 is controlled by a plasma controller 107, and MIG power source 103 is controlled by a MIG controller 108. Power source, or source of power, as used herein, includes the power circuitry such as rectifiers, switches, transformers, SCRs, etc. that process and provide the output power. Plasma power output, as used herein, includes an output having sufficient power for use in a plasma process (it may require transformation before being used in the plasma process). MIG power output, as used herein, includes an output having sufficient power for use in a MIG process (it may require transformation before being used in the MIG process).

In various embodiments the components are housed separately, or in various combinations. For example, in the preferred embodiments plasma power source 102 and plasma controller 107 are implemented with a Miller® Dynasty power supply (operated in a dc mode), which provides a single housing for the plasma controller and plasma power supply. Also, MIG power source 103 and MIG controller 108 are implemented with a Miller Invision® power supply (operated in a dc mode), which also provides a single housing. Other embodiments entail a single power source that provides power for both MIG and plasma, that may include two output circuits.

The controllers may be combined on a single board, and the entire system disposed in a single housing. Wire feeder 109 may be part of the housing, or outside the housing. Also, controller 106 may directly control wire feeder 109, and wire feeder 109 provides control signals to a control input on power source 103 (thus controller 106 also controls power source 103). Controller, as used herein, includes digital and analog circuitry, discrete or integrated circuitry, microprocessors, DSPs, etc., and software, hardware and firmware, located on one or more boards, used to control a device such as a power supply. Control input, as used herein, includes an input received that controls a power supply or other component, such as a setpoint, gate signals, phase control signals, etc.

The invention is performed with the MIG process as EN (electrode negative) or EP (electrode positive) in various alternatives. Speed or quality of the weld for various applications may be improved by appropriately selecting EP or EN. Using EP can result in shunting (or partial shunting) of the arc from the workpiece to the plasma torch. Therefore in at least some embodiments EN will be preferred.

Figure 2:
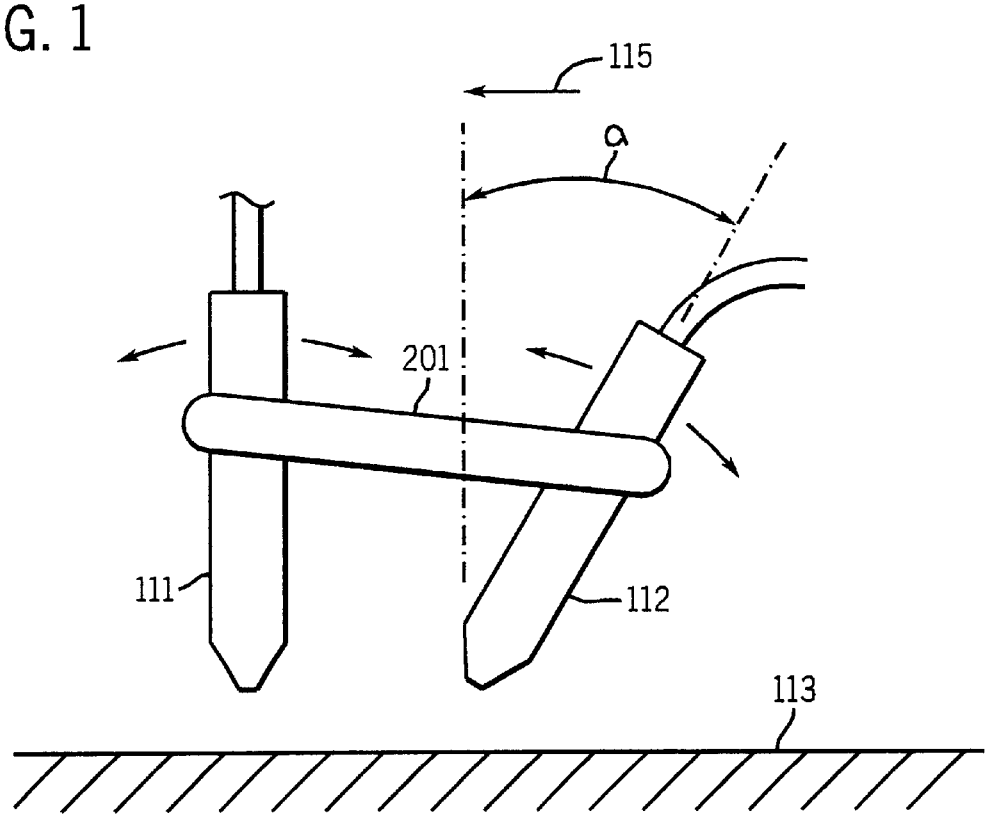
FIG. 2 is a diagram of a plasma torch mounted with a MIG torch.

Referring now to FIG. 2, plasma, torch 111 and MIG torch 112 are mounted on a bracket 201, which hold them a fixed distance apart. As the welder or robot moves MIG torch 112 in the direction of arrow 115, plasma torch 111 precedes it in the direction of travel. Plasma torch 111 is shown perpendicular to workpiece 113 in this embodiment. It is angled between +10 and −10 degrees, and between +5 degrees and perpendicular, or at any other angle in various embodiments. Angles are measured from the perpendicular, and the angle is negative when the arc is angled in the direction of travel.

MIG torch 112 is disposed at an angle a, which as negative 30 degrees in this embodiment. Other embodiments provide for MIG torch 112 to be angled between +10 and −45 degrees, or at any other angle.

When choosing the particular angle of plasma torch 111 and MIG torch 112 the distance between the arcs, the interaction of the arcs, and physical limitations of mounting the torches should be considered. Generally, perpendicular arcs will have less interaction, and should be able to weld at a higher speed. However, the diameter of the torches (near bracket 201) may result in the arcs being to far apart for high speed welding if the torches are perpendicular.

Bracket 201 is chosen with the desired distance between arcs in mind. Higher speed welding may be performed with the separation greater, although it is generally useful to have the arcs as close as possible without interaction. The distance is about ½ inch in the preferred embodiment, between ¼ and 1 inch in another embodiment, and any distance in other embodiments.

The output current is selected based on type of material, speed, desired precision, etc. Generally, the plasma cone is larger than the MIG cone for a given current. It may be desirable to control the plasma cone to keep it narrow so that the current density (and resultant heating and preparation of the zinc) is greater.

The present invention is particularly well suited for welding galvanized steel such as G-90 or G-60, because the plasma arc prepares the zinc in the steel, allowing the MIG arc to weld at a higher rate. G-60 and G-90 galvanized steel is steel wherein the weight of zinc on the steel is 0.60 or 0.90 oz. per square foot, respectively.

One alternative embodiment is a TIG-MIG system where TIG torch is used to prepare the zinc, followed by a MIG torch that weld the workpiece. Thus, in FIGS. 1 and 2 torch 111 maybe a TIG torch, power source 102 maybe a TIG power source, and controller 107 maybe a TIG controller. Other alternatives include various combinations of EP and EN, as desired for particular applications.

Numerous modifications may be made to the present invention which still fall within the intended scope hereof. Thus, it should be apparent that there has been provided in accordance with the present invention a method and apparatus for plasma MIG welding that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A method of plasma MIG welding comprising:
   creating a plasma arc between a plasma torch and at least one workpiece;
   providing relative movement of the plasma arc along a weld path;
   creating a MIG arc between a MIG torch and the at least one workpiece;
   providing movement of the MIG arc relative to the at least one workpiece along the weld path; and
   wherein the MIG arc follows the plasma arc along the weld path.

2. The method of claim 1, further comprising maintaining a constant distance between the plasma torch and the MIG torch.

3. The method of claim 1, wherein the angle of the plasma arc is between +10 degrees and −10° degrees, where 0 degrees is perpendicular.

4. The method of claim 3, wherein the angle of the plasma arc is between perpendicular and +5 degrees, wherein +5 degrees is the plasma arc angled toward the MIG arc.

5. The method of claim 3, wherein the angle of the MIG arc is between +10 degrees and −45° degrees, wherein −45 degrees is the MIG arc angled toward the plasma arc.

6. The method of claim 4, wherein the angle of the plasma arc is between 0 degrees and −30 degrees, wherein −30 degrees is the MIG arc angled toward the plasma arc.

7. The method of claim 1, wherein the distance between the plasma torch and the MIG torch is greater for faster movement along weld path.

8. The method of claim 1, wherein the MIG process is EN.

9. The method of claim 1, wherein the MIG process is EP.

10. A system of plasma MIG welding comprising:
    a plasma torch;
    a MIG torch; and
    wherein the MIS torch and the plasma torch are mounted such that they are a fixed distance from one another.

11. The system of claim 10, wherein the plasma torch is mounted such that the angle of the plasma torch relative to a workpiece is between +10 degrees and −10° degrees, where 0 degrees is perpendicular.

12. The system of claim 11, wherein the plasma torch is mounted such that the angle of the plasma torch relative to the workpiece is between perpendicular and +5 degrees, wherein +5 degrees is the plasma torch angled toward the MIG torch.

13. The system of claim 11, wherein the MIG torch is mounted such that the angle of the MIG arc relative to the workpiece is between +10 degrees and −45° degrees, wherein −45° degrees is the MIG torch angled toward the plasma torch.

14. The system of claim 12, wherein the angle of the plasma torch relative to the workpiece is between 0 degrees and −30 degrees, wherein −30 degrees is the MIG torch angled toward the plasma torch.

15. The system of claim 10, wherein the MIG torch has an EN input.

16. The system of claim 10, wherein the MIG torch has an EP input.

17. A system of plasma MIG welding comprising:
    means for creating a plasma arc between a plasma torch and at least one workpiece;
    plasma movement means for providing relative movement of the plasma arc along a weld path, connected to the plasma torch;
    means for creating a MIG arc between a MIG torch and the at least one workpiece; and
    means for providing movement of the MIG arc relative to the at least one workpiece along the weld path, connected to the MIG torch and the plasma and connected to the plasma movement means, whereby the MIG arc follows the plasma arc along the weld path.

18. The system of claim 17, further comprising means for maintaining a constant distance between the plasma torch and the MIG torch, connected to the MIG torch and the plasma torch.

19. The system of claim 17, wherein the angle of the plasma torch relative to the workpiece is between +10 degrees and −10° degrees, where 0 degrees is perpendicular.

20. The system of claim 19, wherein the angle of the plasma torch relative to the workpiece is between perpendicular and +5 degrees, wherein +5 degrees is the plasma arc angled toward the MIG torch.

21. The system of claim 19, wherein the angle of the MIG torch relative to the workpiece is between +10 degrees and −45° degrees. wherein −45 degrees is the MIG torch angled toward the plasma torch.

22. The system of claim 20, wherein the angle of the plasma torch relative to the workpiece is between 0 degrees and −30 degrees, wherein −30 degrees is the MIG torch angled toward the plasma torch.

23. The system of claim 17, wherein the means for creating a MIG arc includes means for creating an EN arc.

24. The system of claim 17, wherein the means for creating a MIG arc including means for creating an EP arc.

25. A system of plasma MIG welding comprising:
    a plasma torch;
    a MIG torch; and
    means for mounting the MIG torch and the plasma torch a fixed distance from one another.

* * * * *

UNITED STATES PATENT AND TRADEMARK OFFICE
CERTIFICATE OF CORRECTION

PATENT NO. : 6,693,252 B2
DATED : February 17, 2004
INVENTOR(S) : Lin Zhang and Timm Matus It is certified that error appears in the above-identified patent and that said Letters Patent is hereby corrected as shown below:

<u>Title page,</u>
Item [75], Inventors, replace "Lin Zhang, Appleton, WI (US); Timm Matus, Appleton, WI (US)" with -- Lin Zhang, Appleton, WI (US); Tim Matus, Appleton, WI (US) --.

Signed and Sealed this

Second Day of May, 2006

JON W. DUDAS
*Director of the United States Patent and Trademark Office*